(12) United States Patent
Meyers et al.

(10) Patent No.: US 10,359,645 B2
(45) Date of Patent: Jul. 23, 2019

(54) MULTIFUNCTION CONTACT LENS

(71) Applicant: CRT Technology, Inc., Mesa, AZ (US)

(72) Inventors: William E. Meyers, Scottsdale, AZ (US); Jerome A. Legerton, Jupiter, FL (US)

(73) Assignee: Paragon CRT Company LLC, Gilbert, AZ (US)

( * ) Notice: Subject to any disclaimer, the term of this patent is extended or adjusted under 35 U.S.C. 154(b) by 0 days.

(21) Appl. No.: 15/115,742

(22) PCT Filed: Feb. 2, 2015

(86) PCT No.: PCT/US2015/014049
§ 371 (c)(1),
(2) Date: Aug. 1, 2016

(87) PCT Pub. No.: WO2015/119883
PCT Pub. Date: Aug. 13, 2015

(65) Prior Publication Data
US 2017/0010479 A1    Jan. 12, 2017

Related U.S. Application Data

(60) Provisional application No. 61/935,621, filed on Feb. 4, 2014.

(51) Int. Cl.
*G02C 7/04* (2006.01)
*G02C 7/02* (2006.01)

(52) U.S. Cl.
CPC .............. *G02C 7/047* (2013.01); *G02C 7/027* (2013.01)

(58) Field of Classification Search
CPC ................................ G02C 7/047; G02C 7/027

USPC ...................................................... 351/159.23
See application file for complete search history.

(56) References Cited

U.S. PATENT DOCUMENTS

| | | | |
|---|---|---|---|
| 1,918,848 A | 7/1933 | Land |
| 1,963,496 A | 6/1934 | Land |
| 2,005,426 A | 6/1935 | Land |
| 2,123,901 A | 7/1938 | Land |
| 5,073,021 A | 12/1991 | Marron |
| 5,142,411 A | 8/1992 | Fiala |

(Continued)

FOREIGN PATENT DOCUMENTS

| | | |
|---|---|---|
| GB | 1382015 A | 1/1975 |
| WO | 9427169 A1 | 11/1994 |

(Continued)

OTHER PUBLICATIONS

International Search Report for PCT/US2015/014049 dated Apr. 21, 2015.

(Continued)

*Primary Examiner* — Wen Huang
(74) *Attorney, Agent, or Firm* — Law Offices of Damon L. Boyd, PLLC (57) ABSTRACT

The present disclosure relates to therapeutic optical devices configured to provide corneal reshaping for correction of refractive errors of an eye, as well as a peripheral refractive effect on on-axis and/or off-axis light to provide regulation of refractive error development in the eye. Related methods for designing therapeutic optical devices and treatment of an eye with a multifunction therapeutic optical device are also provided.

17 Claims, 3 Drawing Sheets

(56) References Cited

U.S. PATENT DOCUMENTS

| | | |
|---|---|---|
| 5,191,365 A | 3/1993 | Stoyan |
| 5,410,375 A | 4/1995 | Fiala |
| 5,570,143 A | 10/1996 | Newman |
| 5,629,055 A | 5/1997 | Revol |
| 5,963,297 A | 10/1999 | Reim |
| 6,176,579 B1 | 1/2001 | Mandell |
| 6,217,171 B1 | 4/2001 | Auten |
| 6,752,499 B2 | 6/2004 | Aller |
| 7,025,460 B2 | 4/2006 | Smitth |
| 7,216,974 B2 | 5/2007 | Meyers |
| 7,401,922 B2 | 7/2008 | Legerton |
| 7,503,655 B2 | 3/2009 | Smitth, III |
| 7,665,842 B2 | 2/2010 | Ho |
| 7,997,727 B2 | 8/2011 | Ho |
| 8,240,847 B2 | 8/2012 | Holden |
| 8,246,167 B2 | 8/2012 | Legerton |
| 8,672,472 B2 | 3/2014 | Holden |
| 2003/0086055 A1 | 5/2003 | Morris |
| 2004/0223116 A1 | 11/2004 | Baugh |
| 2004/0232394 A1 | 11/2004 | Kahn |
| 2004/0257524 A1* | 12/2004 | Tung ............... A61F 9/0017 351/159.1 |
| 2005/0105047 A1 | 5/2005 | Smitth, III |
| 2006/0152673 A1 | 7/2006 | Cotie |
| 2006/0203189 A1 | 9/2006 | Ho |
| 2007/0115431 A1 | 5/2007 | Smitth, III |
| 2007/0159601 A1 | 7/2007 | Ho |
| 2007/0296916 A1 | 12/2007 | Holden |
| 2008/0218687 A1 | 9/2008 | Phillips |
| 2009/0268154 A1 | 10/2009 | Meyers |
| 2009/0303442 A1 | 12/2009 | Choo |
| 2010/0245759 A1 | 9/2010 | Legerton |
| 2010/0271589 A1 | 10/2010 | Legerton |
| 2011/0032474 A1 | 2/2011 | Lindacher |
| 2011/0085129 A1 | 4/2011 | Legerton |
| 2013/0182215 A1 | 7/2013 | Tung |
| 2014/0043588 A1 | 2/2014 | Grant |

FOREIGN PATENT DOCUMENTS

| | | |
|---|---|---|
| WO | 0144838 A2 | 6/2001 |
| WO | 2007041796 A1 | 4/2007 |
| WO | 2008014544 A1 | 2/2008 |
| WO | 2008131479 A1 | 11/2008 |
| WO | 2010060780 A1 | 2/2011 |

OTHER PUBLICATIONS

Written Opinion for PCT/US2015/014049 dated Apr. 21, 2015.
International Search Report for PCT/US2015/014049 dated Aug. 9, 2016.
International Search Report for PCT/US2010/060780 dated Feb. 15, 2011.

* cited by examiner

MULTIFUNCTION CONTACT LENS

BACKGROUND

Field

The present disclosure relates generally to devices and methods that provide improved correction of various refractive errors by providing both central corneal reshaping as well as mid-peripheral corneal refractive effects to regulate refractive error development in an eye.

Discussion of the Related Art

The use of contact lenses for correction of refractive errors of the eye such as myopia, hyperopia, and astigmatism generally relies on one of two approaches. The first approach is a conventional refractive correction to adjust the focal length of the eye in order to place the focused image on the fovea. This adjustment is accomplished by placing a contact lens having a predetermined refractive power in the light path. A second approach is application of a contact lens to reshape the cornea's surface geometry such that the reshaped cornea's refractive power brings the image into proper focus on the fovea. This second method is generally referred to as corneal refractive therapy, corneal reshaping or orthokeratology.

Refractive error correction using corneal reshaping contact lenses is attractive because the reshaping lenses are worn for relatively short periods of time, such as during sleep, when the wearer is inactive. Refractive error correction via corneal reshaping may be safer and more desirable than complete reliance on corrective contact lenses during the daytime or other periods of active use of vision. Modern overnight corneal reshaping lenses have been successfully used to temporarily correct refractive errors such as myopia, hyperopia, and astigmatism.

However, the corrective effect achieved by reshaping is not permanent, and the reshaping lenses must be worn regularly by a user for the corrected corneal shape to be maintained.

While various approaches to refractive error correction may provide focused vision, structural changes to an eye may lead to progressive development of further refractive error in spite of the corrective measures taken. The importance of a relationship between refraction of a mid-peripheral portion of the cornea and the focal distance produced with respect to the peripheral retina on the progression of various refractive errors has been recognized. For example, a hyperopic defocus at the peripheral retina has been found to influence progression of myopia by stimulating axial elongation of the eye. Recognizing this effect, some lens designers have produced contact lenses for daytime use with central myopic corrective zones (focusing axial light on the fovea) and mid-peripheral refractive zones that produce myopic peripheral retinal defocus. These lenses produce modest regulation of myopic progression, but require continuous daytime use for refractive error correction. Hence, the usefulness of these corrective lenses in regulating myopic progression is only derived during daytime wear, and they do not provide the benefit of corneal reshaping. On the other hand, overnight wear corneal reshaping lenses used for correction of myopia provide no benefit similar to that described above when worn for open-eye daytime activity with respect to regulation of myopic progression. Indeed, such lenses may induce an undesirable hyperopic defocus during daytime wear that can produce an effect opposite of that required for regulation of myopic progression.

There is thus a need in the art for multifunction therapeutic optical devices that can provide both correction of refractive error by achieving desired corneal reshaping as well as regulation of refractive error development by producing a predetermined peripheral retinal focus or defocus.

SUMMARY

The present disclosure provides devices and methods for providing refractive error correction by corneal refractive therapy along with regulation of refractive error progression using a multifunctional therapeutic optical device. In various embodiments, a multifunctional contact lens provides corrected central vision via reshaping of the central corneal tissue of an eye and/or provides modified mid-peripheral optical power by reshaping of the mid-peripheral cornea, such as by regular overnight wear of the multifunction lens. Moreover, the same lens may further be worn during periods of vision use to provide peripheral refractive effects suitable for regulation of refractive error progression without interfering with central vision refractive error correction.

The devices and methods disclosed herein provide a multifunction contact lens with a central optical zone configured to impart an altered shape to the central cornea of an eye suitable to provide temporary refractive error correction to central vision during lens wear and after lens removal, as well as a peripheral optical zone configured to provide regulation of refractive error progression during open-eye use of the lens. The peripheral optical zone may provide a peripheral optical zone refractive effect during open-eye use that can focus on-axis and off-axis light at a target focal point or focal plane relative to the peripheral retina of the eye treated with the multifunction lens. The peripheral optical zone refractive effect may be plus power or minus power relative to the refractive effect of the mid-peripheral cornea of the untreated eye on the same on-axis and/or off-axis light, and the target focal point can provide a myopic defocus, a hyperopic defocus, or on-retina focus with respect to the mid-peripheral retina, thereby providing any desired peripheral retinal stimulus required for regulation of refractive error development and progression. The peripheral optical zone effect may also be provided by wavefront modulation produced by the peripheral optical zone of a multifunction lens, for example, using various diffractive or refractive optical effects. Furthermore, the peripheral optical zone refractive effect may be different in different semi-meridians of the eye. The peripheral optical zone refractive effect of a lens is configured taking into account the mid-peripheral corneal geometry following central corneal reshaping as well as the tear lens formed between the multifunction contact lens and the corneal surface underlying the peripheral optical zone of the lens. The mid-peripheral cornea may or may not be reshaped by a multifunctional contact lens in accordance with various embodiments.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

DETAILED DESCRIPTION

The present disclosure relates to devices and methods for correction of various refractive error conditions and regulation of refractive error development. Persons skilled in the art will readily appreciate that various aspects of the present disclosure can be realized by any number of devices and methods configured to perform the intended functions. Stated differently, other devices and methods can be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure can be described in connection with various principles and beliefs, the present disclosure should not be bound by theory.

Application of contact lenses to reshape the surface of a wearer's cornea, commonly referred to as corneal refractive therapy or orthokeratology, has been successfully used to treat various refractive errors such as myopia, hyperopia, and astigmatism. Individuals with refractive error conditions amenable to corneal refractive therapy are often attracted to this approach for aesthetic, convenience and safety reasons. Corneal reshaping is frequently performed by application of the lenses during overnight periods when the user is not actively using vision. Users may enjoy a level of freedom from concern over corrective lenses during periods of active vision use, and can participate in athletic and other physical activities without irritation or safety concerns with respect to a corrective device.

Some refractive error conditions, such as progressive myopia in young children, can continue to increase in severity due to physiological and anatomical changes to the eye despite correction of the primary refractive error condition.

Moreover, central correction alone may actually exacerbate progression. Although multifocal soft contact lenses for daily wear can provide the peripheral refractive effects suitable to partially regulate refractive error progression, these lenses do not provide the benefits of corneal reshaping desired by many consumers. A multifunction contact lens that provides corneal reshaping for central vision refractive error correction and foveal focus, and/or mid peripheral reshaping for peripheral retinal relative defocus as well as peripheral refractive effects suitable to regulate refractive error progression during periods of open-eye wear during active vision use is presented for the first time in the present disclosure.

In accordance with various embodiments, multiple optical factors can influence the refraction of on-axis or off-axis light incident to the cornea and the resultant focus or defocus of a peripheral image with respect to the mid-peripheral retina. These elements can include: 1) the geometry of the eye in the region of the mid-peripheral retina; 2) the geometry of the mid-peripheral cornea after treatment by a corneal reshaping lens; 3) the geometry of the posterior surface of a peripheral optical zone of the corneal reshaping lens; 4) the tear lens created by the relationship of items 2 and 3 above; and 5) the geometry of the anterior surface of the peripheral optical zone of the corneal reshaping lens. As described in greater detail below, lenses in accordance with the present disclosure may consider these optical elements in relation to the refractive state of the subject.

Figure 1:
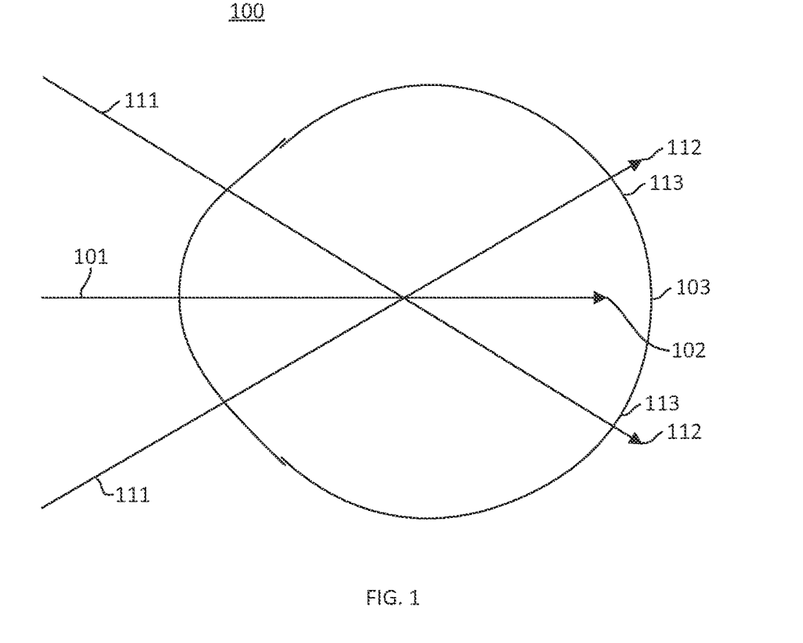
FIG. 1 illustrates an optical diagram of a myopic eye in accordance with the present disclosure.

With reference now to FIG. 1, an optical diagram of an uncorrected myopic eye 100 is illustrated. As shown, on-axis light 101 is focused at a point 102 anterior to the central retina 103. Off-axis light 111 may be focused nearer the retina at the peripheral retina 113, or in some cases may be focused at a point 112 posterior to the peripheral retina 113, also referred to as hyperopic defocus. As used herein, the term "defocus" means an image plane or point of focus that does not fall on the retina of a treated or reference eye, but is located a certain distance anterior to the retina (i.e., myopic defocus) or posterior to the retina (i.e., hyperopic defocus) of the treated or reference eye. It is understood by those skilled in the art that hyperopic defocus may stimulate axial elongation of the region of the eye in proximity to the hyperopic defocus, and myopic defocus may reciprocally inhibit axial elongation of the region of the eye in proximity to the myopic defocus.

Figure 2:
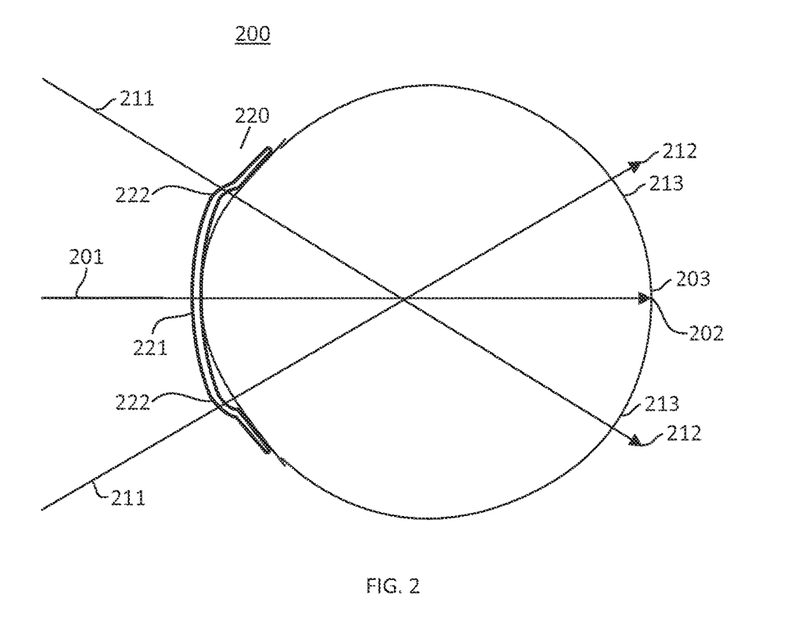
FIG. 2 illustrates an optical diagram of a prior art optical device applied to an eye in accordance with the present disclosure.

With reference now to FIG. 2, an optical diagram of a myopic eye 200 corrected with a prior art optical device 220 is shown. Such prior art optical devices used for correction may include, for example conventional contact lenses or orthokeratology lenses. Orthokeratology lenses such as optical device 220 have been used to reshape the corneal tissue of myopic eyes. As illustrated in FIG. 2, such lenses may have a lens geometry that provides a near-zero lens power with respect to axial light 201 in the central corneal treatment zone 221 while imparting an altered curvature to the central cornea tissue, thereby providing refractive correction suitable to restore focused central vision with a focal point 202 at central retina 203, both with the treatment lens in place as well as for a temporary period of time after the treatment lens is removed.

However, the curvatures of the anterior surfaces of traditional orthokeratology lenses combined with the reverse curves used for the posterior surfaces of the lenses in the mid-peripheral regions 222 frequently produces negative refractive effects on off-axis light 211 passing through the mid-peripheral region of the lenses. Such negative refractive effects impart a hyperopic defocus effect, with a focal point 212 posterior to the peripheral retina 213 and opposite of that desired for optimum vision correction and/or regulation of refractive error progression. This negative effect is of no concern when these lenses are only worn during sleep. The potentially deleterious effect of the significant relative hyperopic defocus occurs when such lenses are worn during active vision activities. And while conventional lenses designed for daytime use may be designed to provide refractive correction of both axial light incident to the central cornea as well as on-axis or off-axis light entering the mid-peripheral cornea, conventional lenses do not provide the advantages of corneal reshaping, and refractive error correction requires continuous application during periods of vision use. Neither corneal reshaping nor conventional lenses alone have demonstrated an ability to achieve better than an approximately 50% reduction of myopic progression.

In various embodiments of the present disclosure, a therapeutic optical device is provided. In accordance with various embodiments of the present disclosure, a therapeutic optical device may be a multifunction therapeutic optical device, such as a multifunction contact lens. A multifunction therapeutic optical device may be configured to provide refractive error correction of an eye via reshaping of underlying corneal tissue. In addition, a multifunction therapeutic optical device may be configured to provide refractive effects conferred by aspects of the lens as applied to an eye separate from and/or in addition to any structural change to the underlying tissue of the eye, as described in greater detail below.

In general, the term "therapeutic optical device" should be broadly construed to include any structure or method suitable to produce refractive error correction. As used herein, a therapeutic optical device may include any device that produces refractive error correction via corneal reshaping, refractive error correction via a refractive effect of the lens itself or of the lens as applied to an eye, or any combination thereof. Refractive effects that may be conferred by a therapeutic optical device as applied to an eye separate from a structural change to the eye may include, for example, a refractive effect of the lens itself or any portion thereof, a refractive effect of a tear lens (also referred to as a "tear pool," "tear layer," or "tear film") resulting from application of the lens to the eye, a refractive effect of an interface (i.e., an air/lens interface or a tear/lens interface) resulting from application of the lens to the eye, and the like.

As used herein, "refractive error correction" may be used to refer to any refractive change or effect, regardless of whether the change or effect results in bringing refracted light into focus with respect to the retina of an eye (such as by placing a refracted image plane on the retina) or the change or effect produces a desired defocus with respect to the retina of the eye. Refractive error correction may include any refractive effect or combination of effects by which different refractive error correction is produced in the same or different semi-meridians of an eye. For example, a central retinal image field may be focused on the retina in one or more semi-meridians or in all meridians, while a peripheral image field may not be focused on the retina in at least one semi-meridian.

As used herein, the terms "plus power" and "minus power" refer to refractive powers that are greater than and less than, respectively, the refractive power of the relevant portion of the eye being treated. For example, a plus power peripheral optical zone of a lens is one that provides a refractive power or effect that is greater in plus power or less in minus power than the refractive power of the mid-peripheral cornea underlying the peripheral optical zone of the lens.

In various embodiments, a multifunction therapeutic optical device may be configured for direct and/or indirect contact with ocular tissue of an eye. For example, in accordance with various embodiments, a therapeutic optical device is configured to rest upon a portion of the cornea. In various embodiments, a therapeutic optical device may be configured to rest upon a portion of the cornea and/or a portion of the sclera of an eye.

In accordance with various embodiments, a multifunction therapeutic optical device is comprised of one or more gas permeable, or otherwise biocompatible, materials. For instance, the therapeutic optical device may be comprised of one or more of fluorosilicon acrylate, silicon acrylate, polymethylmethacrylate, a silicon hydrogel, or another suitable material. In various embodiments, different portions of a given therapeutic optical device may be comprised of the same or different materials.

Figure 3:
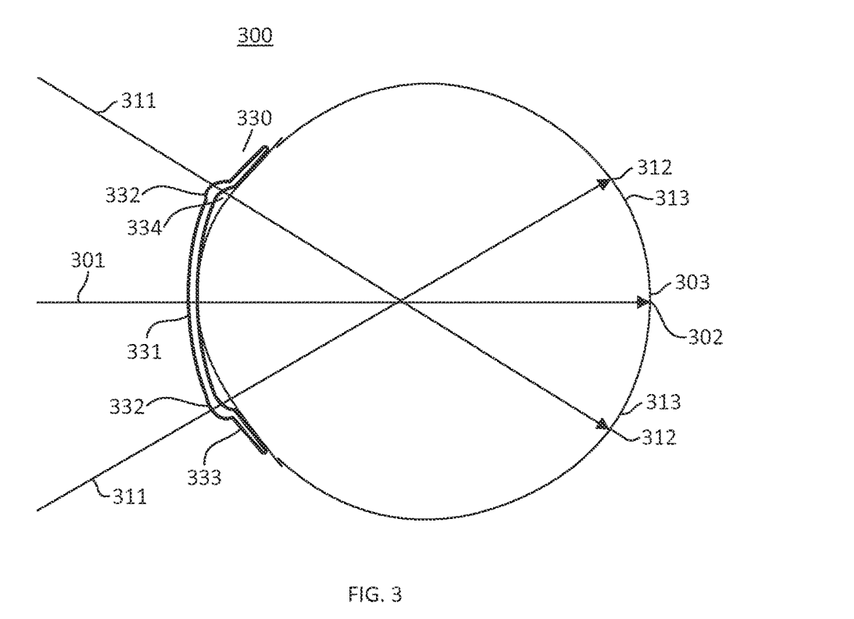
FIG. 3 illustrates an optical diagram of a therapeutic optical device applied to an eye in accordance with the present disclosure.

In various embodiments and with reference now to FIG. 3, a multifunction therapeutic optical device may comprise a multifunction contact lens 330 with a central optical zone 331, a peripheral optical zone 332, and a peripheral landing zone 333. In accordance with various embodiments, central optical zone 331 is a central corneal reshaping zone and comprises the axial center of the lens, peripheral optical zone 332 is concentric to and outside central optical zone 331, and peripheral landing zone 333 is concentric to and outside peripheral optical zone 332. In various embodiments, peripheral optical zone 332 may vault the mid-peripheral cornea in at least one semi-meridian, while central optical zone 331 is in contact with the cornea and peripheral landing zone 333 are in contact with the cornea and/or the sclera in the same semi-meridian.

In various embodiments and as described in greater detail in the following sections, central optical zone 331 has a posterior surface configured to impart an altered curvature to the central cornea of an eye in at least one semi-meridian, while peripheral optical zone 332 has a posterior surface that does not alter the curvature of the underlying mid-peripheral cornea or otherwise reshape the corneal tissue or impinge on the ability of the central optical zone 331 to reshape the central cornea of the eye in the same semi-meridian. In various other embodiments, a central optical zone, a peripheral optical zone, and/or any other zone of a multifunction contact lens may reshape at least a portion of a mid-peripheral cornea of an eye.

In accordance with various embodiments, the central optical zone comprises the axial center of a multifunction contact lens. In various embodiments, the central optical zone may have a diameter of from about 0.1 mm to about 14 mm, and more preferably from about 3 mm to about 12 mm.

In various embodiments, a multifunction contact lens may be structurally or materially configured to provide at least one of rotational stability, alignment and/or centration, as discussed in greater detail below.

In accordance with various embodiments, the central optical zone of a multifunction contact lens is configured to impart an altered shape or radius of curvature to at least a portion of the central cornea of an eye. The altered shape or curvature imparted to the central cornea of an eye may produce a central corneal refraction with a first focal point relative to a fovea or central retina. In various embodiments, the first focal point may be on the fovea or central retina. In other embodiments, the first focal point may produce a desired defocus relative to the fovea or central retina.

For example, and referring again to FIG. 3, a central optical zone 331 of a multifunction contact lens 330 may comprise a posterior surface profile having an increased radius of curvature (i.e., a flattened or lower eccentricity curvature) than the cornea of an eye 300 (such as myopic eye 100 illustrated in FIG. 1). As a result, in accordance with various embodiments, the central cornea of eye 300 may be reshaped by treatment with the multifunction contact lens 330 such that the central cornea has a decreased refractive power, thereby bringing previously myopic defocused axial light 301 in the uncorrected eye into focus on the central retina 303 or fovea of the eye. Similarly, in various embodiments, the posterior surface profile of the central optical zone of a multifunction contact lens may be configured to impart a decreased radius of curvature to the central cornea of an eye, for example, to provide an increased refractive power for correction of hyperopic vision.

In various embodiments, a central optical zone of a multifunction contact lens may be configured to provide a central optical zone refractive power that is substantially zero; i.e., the central optical zone of the lens may be configured such that it does not provide a refractive effect or power as a function of the optical properties of the lens itself aside from the altered corneal geometry imparted by the lens to an eye. For example, the geometries of the anterior surface and the posterior surface of the central optical zone may be substantially parallel to one another or otherwise configured so that the central optical zone does not provide a central optical zone refractive power as a function of the combination of the anterior and posterior surface geometries of the central optical zone.

As described above, in various embodiments, a multifunction contact lens may provide refractive error correction by reshaping the central corneal tissue of an eye in all meridians. In other embodiments, the central optical zone may be configured reshape the central cornea in one or more meridians or semi-meridians. In various embodiments, corneal reshaping may vary between semi-meridians adjacent, orthogonal, and/or alternate to one another. In other words, a central optical zone may be rotationally asymmetric to thereby influence the shape of the central cornea (e.g., axial, equatorial, mid-peripheral and/or far peripheral) in a rotationally asymmetric manner.

In various embodiments, the anterior and/or posterior surfaces of the central optical zone may be configured to have a partially spherical geometry, while in others, it may have an aspherical, toric, multifocal or rotationally non-symmetrical geometry as described above, depending on the refractive error to be regulated and/or the ocular tissue to be fitted. Measurements of the ocular tissue to be fitted and/or the refractive error to be regulated may be obtained, for example, using keratometry, corneal topography, optical coherence tomography, Scheimpflug imaging, or other biometric instrumentation presently known or hereinafter devised. As used herein, the term "geometry" should not be construed as limiting and may be used to describe any two or three dimensional shape or configuration, whether or not it may be described by a Euclidean, elliptic, hyperbolic, or any other geometric function. In accordance with various embodiments, the ideal geometric configuration of a lens or surface for refractive error correction or regulation may not be described as a spheric or conic section.

While not wishing to be bound by theory, corneal reshaping may take place as a function of pressure gradients produced by predetermined interactions between a lens and the cornea. For example, and with reference again to FIG. 3, in various embodiments, a lower eccentricity of central optical zone 331 relative to the central cornea may create a toroid of decreased central optical zone pressure on the central corneal tissue underlying the peripheral aspect of central optical zone 331 just medial to peripheral optical zone 332. This toroid of decreased pressure allows for the commencement of an increase in corneal thickness just medial to peripheral optical zone 332 and facilitates a transfer of epithelial cells and intracellular and intrastromal fluids into the central cornea underlying the peripheral aspect of central optical zone 331 as a response to the compression force of the lens on the eye during closed eye wearing and due to lid force pushing on central optical zone 331.

In accordance with various embodiments, when applied to an eye and worn in a program of corneal reshaping for myopia (e.g., overnight corneal reshaping), multifunction contact lens 330 would cause the central cornea of the eye 300 to decrease in optical power with respect to axial light (e.g., increase the radius of curvature of the central cornea to create a longer focal length so that axial light 301 is focused at focal point 302 on central retina 303, rather than a focal point anterior to the central retina in the eye prior to reshaping). In various embodiments, following treatment, the mid-peripheral cornea maintains substantially the same keratometric curvature and power. In other embodiments, following treatment, the mid-peripheral corneal geometry may be altered, whether due to effects of central corneal tissue reshaping and transfer of epithelial cells and intracellular and intrastromal fluids into the mid-peripheral corneal region, or due to a reshaping effect of the posterior surface profile of the lens in at least a portion of the peripheral optical zone.

In accordance with various embodiments, the altered shape imparted to the cornea of an eye may persist for a period of time following removal of a multifunction contact lens, thereby providing the desired refractive error correction to the eye during periods of time in which the lens is not applied to the eye. For example, a multifunction contact lens in accordance with various embodiments may be applied to an eye and worn during a period in which vision is unused, such as overnight or during a period in which the wearer is asleep. Periodic application of a multifunction contact lens in accordance with various embodiments to an eye can reshape and maintain an altered surface geometry of at least a portion of the cornea of the eye. The altered surface geometry imparted by a multifunction contact lens may provide refractive error correction suitable, for example, to bring an image into proper focus on the fovea when the multifunction contact lens is not in place in the eye and may persist for a period of time, such as one or more days.

In various embodiments, a multifunction contact lens may also comprise a peripheral optical zone. In accordance with various embodiments, a peripheral optical zone of a multifunction contact lens may be configured to provide a refractive effect suitable to focus a peripheral image field in at least one semi-meridian at a target focal point with respect to the mid-peripheral retina of an eye. In various embodiments, a peripheral optical zone may provide a refractive effect as a function of the optical properties of the lens in the peripheral optical zone. These optical properties may include refractive effects conferred by the geometry of the anterior and/or the posterior surfaces of the lens in the peripheral optical zone, as well as wavefront modulation such as diffractive or refractive optical effects that may be conferred by the lens itself. For example, the peripheral optical zone of a multifunction lens may comprise a medium with polarizable bonds oriented to produce wavefront modulation via a birefringent effect.

In various embodiments, a peripheral optical zone has a width substantially similar to that of the underlying mid-peripheral cornea. In various embodiments, the width of the peripheral optical zone is from about 0.25 mm to about 4 mm, or more preferably from about 0.75 mm to about 3 mm, or most preferably about 1.75 mm. The peripheral optical zone width may have a variable width along its length (i.e., along the length of a line defining the circumference of the peripheral optical zone).

In various embodiments, the posterior surface of the peripheral optical zone may vault the mid-peripheral cornea without contacting the corneal tissue along all or a portion of the posterior surface of the peripheral optical zone, for example, by having a radius that is shorter than that of the underlying mid-peripheral cornea. Various other approaches are possible and may be used such that a peripheral optical zone vaults the mid-peripheral cornea. For example, the posterior surface profile of a peripheral optical zone may be spherical, aspherical, defined by a polynomial, uncurved and defined by an angle, defined by spline mathematics, or described by a sigmoidal curve. In accordance with various embodiments, the posterior surface profile of a peripheral optical zone may be configured to accommodate reshaping of the central cornea by the central optical zone and/or to provide tear lens formation, as discussed in greater detail below. In various embodiments, all or a portion of the posterior surface of a peripheral optical zone may contact and/or contribute to reshaping the underlying mid-peripheral cornea.

In accordance with various embodiments and referring again to FIG. 3, peripheral optical zone 332 of multifunction contact lens 330 may be configured to provide a peripheral optical zone refractive effect suitable to focus on-axis and/or off-axis light 311 incident to the peripheral optical zone at a target focal point 312 with respect to the peripheral retina 313 of eye 300. In various embodiments, peripheral optical zone 332 is configured to provide a peripheral optical zone refractive effect by virtue of the optical features or refractive effect of peripheral optical zone 332 of lens 330 (i.e., the peripheral optical zone refractive power). In various embodiments, peripheral optical zone 332 is further configured to provide a peripheral optical zone refractive effect comprising the optical features or refractive effect of a tear lens 334 formed in the area underlying peripheral optical zone 332 when multifunction contact lens 330 is applied to eye 300. In various embodiments and as illustrated, the target focal point 312 for on-axis and/or off-axis light 311 incident to the peripheral optical zone 332 and passing through tear lens 334 and the mid-peripheral corneal tissue underlying peripheral optical zone 332 may be located on the mid-peripheral retina 313, with the combined refractive effects of the aforementioned features contributing to the overall refraction of on-axis and/or off-axis light and the focal point or focal plane relative to the mid-peripheral retina (i.e., the peripheral optical zone refractive effect).

Figure 4:
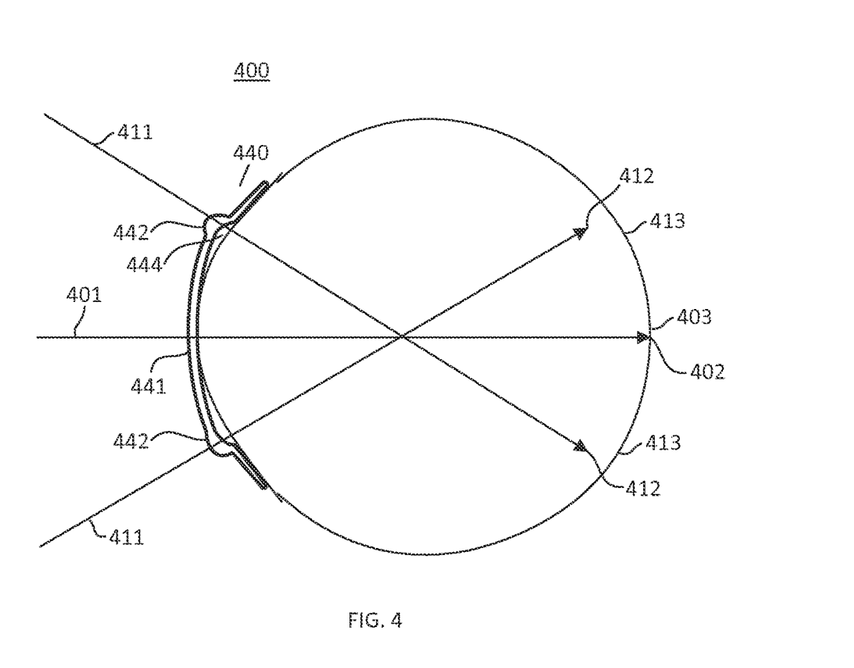
FIG. 4 illustrates an optical diagram of a therapeutic optical device applied to an eye in accordance with the present disclosure.

In other embodiments and referring now to FIG. 4, peripheral optical zone 442 of a multifunction lens 440 may be configured to provide a peripheral optical zone refractive effect suitable to focus on-axis and/or off-axis light 411 incident to the peripheral optical zone at a target focal point 412 that is located anterior to the mid-peripheral retina 413 (i.e., a myopic defocus) of eye 400, while central optical zone 441 is configured to reshape the central cornea so as to focus axial light 401 at a focal point 402 on the central retina 403. As described above, the combined refractive effects of peripheral optical zone 442, as well as a tear lens 444 and the mid-peripheral corneal tissue underlying the peripheral optical zone may contribute to the overall refraction of on-axis and/or off-axis light 411. In various embodiments, a greater refractive power of the peripheral optical zone 442, as compared to the peripheral optical zone 332 of multifunction lens 330 (FIG. 3), with all other features of the lenses and eyes of FIGS. 3 and 4 being equal, may provide a myopic defocus for axial light 411 incident peripheral optical zone 442, with a focal point 412 that is anterior to mid-peripheral retina 413.

In various embodiments, peripheral optical zone optics may vary between semi-meridians adjacent, orthogonal, and/or alternate to one another. In other words, a peripheral optical zone may be rotationally asymmetric to thereby influence local globe growth and shape of the globe (e.g., axial, equatorial, mid-peripheral and/or far peripheral) in a rotationally asymmetric manner. Additionally, peripheral optical zone optics may vary radially along a single semi-meridian.

In general, one skilled in the art will appreciate that numerous approaches may be taken to accomplish select mid-peripheral retinal focus (or defocus), all of which are contemplated herein. For example, select mid-peripheral retinal focus may be achieved with refractive, birefringent, or diffractive optics.

In various embodiments, select mid-peripheral retinal focus is achieved with a peripheral optical zone having a refractive power different from that conferred by the reshaping and optical properties of the central optical zone, such that all or a portion of on-axis and/or off-axis light rays along a semi-meridian focus in front of or behind on-axis and/or off-axis light rays along another semi-meridian, with reference to the retina.

In other embodiments, select mid-peripheral retinal focus is achieved with a peripheral optical zone comprised of a birefringent material having properties selected to cause all or a portion of on-axis and/or off-axis light rays along a semi-meridian to be focused in front of or behind on-axis and/or off-axis light rays along another semi-meridian, with reference to the retina, for example, in a manner similar to that described in U.S. Pat. No. 7,905,595, entitled "System and Method to Treat and Prevent Loss of Visual Acuity."

In other embodiments, select mid peripheral retinal focus is achieved by a peripheral optical zone with diffractive optics. More particularly, in exemplary embodiments, diffractive optics are used to focus all or a portion of peripheral light rays along a semi-meridian in front of or behind peripheral light rays along another semi-meridian, with reference to the retina.

In accordance with various embodiments, a peripheral optical zone may provide any suitable refractive effect to achieve any suitable focus or defocus of off-axis light incident to the peripheral optical zone with respect to the peripheral retina of an eye.

In various embodiments, a multifunction contact lens comprises a peripheral landing zone. The peripheral landing zone may provide contact with the surface of the eye at a point of tangency located on the posterior surface of the peripheral landing zone. The point of tangency can provide contact between the lens and the eye at the peripheral cornea or beyond the cornea. In various embodiments, the point of tangency may be located on the sclera, for example, on the bulbar conjunctiva covering the sclera of the eye. In various embodiments, the posterior surface profile of the peripheral landing zone may be uncurved and defined by an angle such that it is not in contact with the peripheral cornea or sclera at the most medial aspect or peripheral aspect of the peripheral landing zone, but is in contact with the peripheral cornea or sclera at a point of tangency along the length of the posterior surface of the peripheral landing zone, such as at a midpoint of the peripheral landing zone.

While it is contemplated that the peripheral landing zone in some embodiments could be curved and/or defined by a polynomial, in various embodiments, the peripheral zone is uncurved and defined by an angle. The angle may be defined in any number of ways. For example, in various embodiments, the angle may be defined between a chord perpendicular to the central axis of the lens that passes through the junction between the peripheral optical zone and the peripheral landing zone and a line from the apex to the point of tangency on the cornea or sclera. In exemplary embodiments, the point of tangency is approximately midway between its most medial aspect and most peripheral aspect.

In various embodiments, the peripheral landing zone of a multifunction contact lens may terminate in a convex elliptical edge smoothly joining the anterior surface and the posterior surface of the lens.

Various therapeutic optical device structures may be used in accordance with the present disclosure in connection with one or more structural or material design elements configured to provide rotational stability, alignment and/or centration.

For example, with application to various embodiments of the present disclosure configured to rest upon the cornea or sclera, some embodiments may comprise one or more of prism ballasting, double slab off, and anterior thickness variations to assist with rotational stability, alignment and/or centration. In various embodiments, rotational stability, alignment and/or centration may be improved by spatially matching the posterior structure surface with one or more corneal or scleral topographical variations.

Any methods or structural or material design elements configured to give rotational stability, alignment and/or centration to therapeutic optical structures of the present disclosure are within the scope of the present disclosure.

In various embodiments, a method of designing a therapeutic optical device is provided. A method of designing a therapeutic optical device may comprise steps of evaluating the central corneal geometry of an eye, determining an altered central corneal geometry suitable to provide refractive error correction, such as to provide focused central vision, and evaluating the mid-peripheral corneal geometry of the eye. A method of designing a therapeutic optical device may further comprise configuring the posterior surface of the device. The posterior surface of the device may be configured to impart the altered central corneal geometry determined in an earlier step, and may further be configured to provide a tear lens and/or alter the corneal geometry in the mid-peripheral corneal region. A method of designing a therapeutic optical device may further comprise configuring the anterior surface of the device. In various embodiments, a method of designing a therapeutic optical device may further comprise configuring the anterior surface of the device. The anterior surface may be configured to provide a central optical zone refractive power and a peripheral optical zone refractive power. In accordance with various embodiments, a therapeutic optical device may be further configured to provide wavefront modulation in one or more zones.

Figure 5:
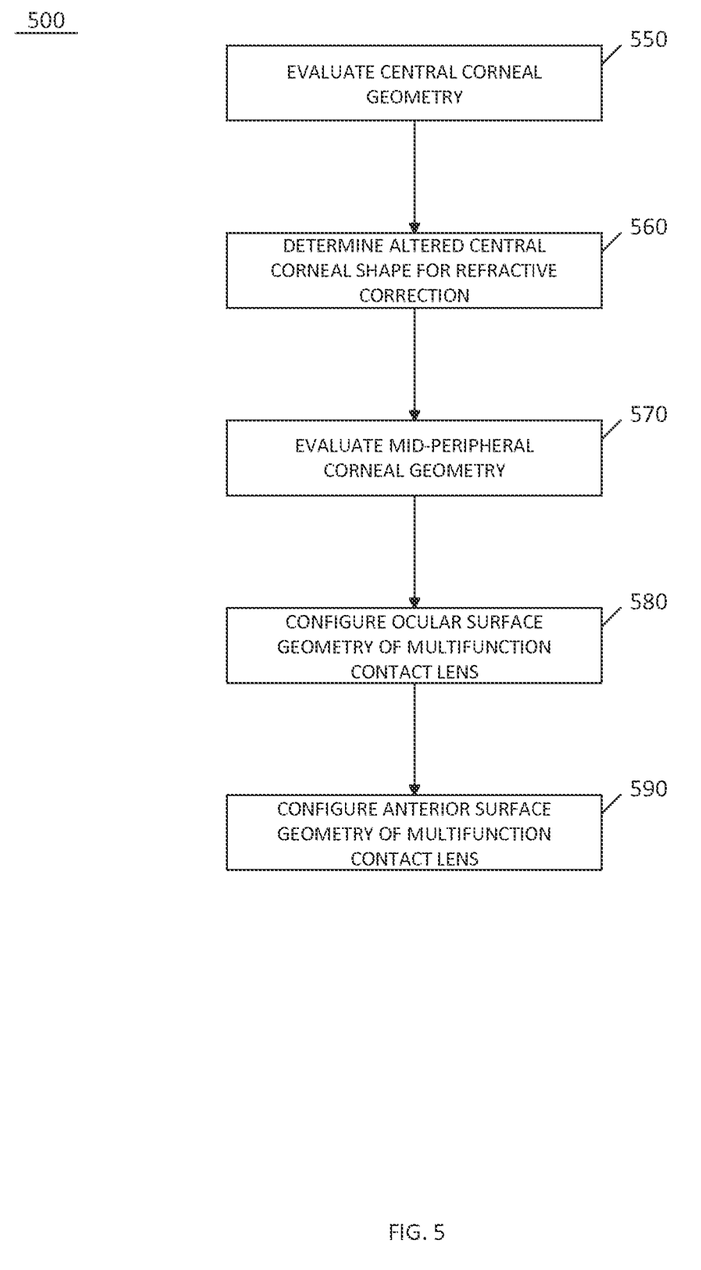
FIG. 5 illustrates a method of designing a therapeutic optical device in accordance with the present disclosure.

In various embodiments and as illustrated in FIG. 5, a method of designing a therapeutic optical device may comprise a method 500 for designing a multifunction contact lens suitable to provide refractive error correction and regulation of refractive error development.

In accordance with various embodiments, a method 500 of designing a multifunction contact lens comprises evaluating a central corneal geometry of an eye 550. A central corneal geometry may be evaluated using any suitable technique for obtaining measurements of ocular tissue, as described above.

In accordance with various embodiments, a method 500 of designing a multifunction contact lens further comprises determining an altered central corneal shape of an eye 560 suitable to provide a central corneal refractive correction. In various embodiments, the altered central corneal shape may be determined predictively, such as by using modeling software or based on data from geometries of known fitted lenses and/or known pre- and post-fitting corneal geometry profiles of treated patients. In other embodiments, the altered central corneal shape may be determined empirically, such as by application of corneal reshaping lenses followed by post-fitting corneal geometry evaluation. In various embodiments, a combination of predicted and empirical information may be used to determine the desired altered central corneal shape or geometry to be imparted by a multifunction contact lens.

In accordance with various embodiments, a method 500 of designing a multifunction contact lens comprises evaluating a mid-peripheral corneal geometry of an eye 570. In various embodiments, an eye may comprise an eye in which the central cornea has been reshaped, for example, to impart a central corneal shape that is altered from the untreated state. An altered central corneal shape may comprise all of the central cornea, or may comprise a portion or semi-meridian of the central cornea. The central corneal shape of an eye may be imparted by a lens that is different from the lens that is the subject of the method 500 disclosed herein, or the central corneal shape may be imparted by a lens designed as disclosed herein. In accordance with various embodiments, the eye subject to evaluation relative to the mid-peripheral corneal geometry is reshaped at the central cornea to impart an altered central corneal shape that is suitable to focus axial light in a first focal plane relative to the retina.

In accordance with various embodiments, a method of designing a multifunction contact lens further comprises configuring a posterior surface profile of the multifunction contact lens 580. In various embodiments, a multifunction contact lens comprises a central optical zone, a peripheral optical zone, and a peripheral landing zone, as described above. The posterior surface profile and its relationship to the surface of an eye may be configured differently in each zone of a lens, with each zone serving a different optical and/or structural function. Multifunction contact lenses with additional zones may be designed in accordance with various embodiments of the present disclosure.

In various embodiments, the posterior surface profile of a central optical zone may be configured to impart and/or maintain the altered central corneal shape in at least one semi-meridian of the central cornea of an eye. The posterior surface profile of a central optical zone required to impart and/or maintain the altered central corneal shape of the eye may be predicted based on the known geometry of a fitted lens used to impart an altered central corneal shape and the known pretreatment geometry of the eye, or the altered central corneal curvature of an eye may be measured, such as by using corneal topography instrumentation, with the measurement used to determine the appropriate posterior surface profile of a multifunction contact lens in a central optical zone. Similarly, the posterior surface profile of a central optical zone may be configured based on a combination of predicted and measured topography of an altered or unaltered central cornea.

In various embodiments, the posterior surface profile of the multifunction contact lens in the peripheral optical zone is configured to provide a tear lens having a tear lens refractive power in at least one semi-meridian when applied to an eye. In accordance with various embodiments, the tear lens of a multifunction contact lens applied to an eye is a function of at least the interaction of: 1) the topographical geometry of the mid-peripheral cornea (i.e., the area of the cornea underlying the peripheral optical zone of the lens) of the eye following central corneal reshaping, and 2) the posterior surface profile of the lens in the peripheral optical zone. The tear lens created by a multifunction contact lens in accordance with various embodiments will contribute to a refractive power of the lens applied to the eye at the peripheral optical zone of the lens and/or the mid-peripheral cornea. In various embodiments, the refractive power of a tear lens in an area underlying the peripheral optical zone of a multifunction contact lens may be predicted based on the known or predicted surface topography of the eye as well as the geometry and posterior surface profile of the multifunction contact lens. The refractive power of a tear lens in an area underlying the peripheral optical zone of a multifunction contact lens may also be measured using various methods known to a person of skill in the art. These methods include, for example, the use of peripheral refractors and wavefront aberrometers.

A posterior surface profile of a peripheral optical zone of a multifunction contact lens may be configured with various profiles, examples of which are described above. Any posterior surface profile suitable to allow for (i.e., not impinge on) desired reshaping in the adjacent central corneal region and to provide a known or predicted tear lens in an area underlying the peripheral optical zone of a multifunction contact lens in at least one semi-meridian is within the scope of the present disclosure.

In accordance with various embodiments, the posterior surface profile of a peripheral landing zone of a multifunction contact lens may be configured to provide contact between the multifunction contact lens and the peripheral cornea or sclera. In various embodiments, the posterior surface profile of the peripheral landing zone may be planar and configured to tangentially contact the peripheral cornea or sclera of an eye at a desired diameter of the lens (i.e., at a desired distance along the radial length of the posterior surface of the peripheral landing zone, such as a midpoint of the posterior surface of the peripheral landing zone). In accordance with various embodiments, the posterior surface profile of the peripheral landing zone is configured to deviate from the corneal or scleral surface medial to and/or peripheral to the point to tangential contact with the cornea or sclera, regardless of whether the posterior surface profile is planar, curved, or has any other profile. In various embodiments, the posterior surface of the multifunction contact lens at a peripheral aspect of the peripheral landing zone terminates in a convex elliptical edge terminus or contour that smoothly joins the posterior surface and the anterior surface of the lens.

In accordance with various embodiments, a method of designing a multifunction contact lens comprises configuring an anterior surface geometry of the multifunction contact lens 590. In various embodiments, configuring an anterior surface geometry may comprise configuring an anterior surface geometry in various zones of a multifunction contact lens, such as a central optical zone, a peripheral optical zone, and a peripheral landing zone, as described in greater detail below.

In various embodiments, an anterior surface profile of a multifunction contact lens may be configured in a central optical zone to provide any necessary optical power. In various embodiments, a central optical zone of a multifunction contact lens may be configured with an anterior surface profile that substantially parallels the posterior surface profile of the lens in the same zone such that the central optical zone does not provide an optical power or refractive error correction due to the optics of the lens itself. Rather, the refractive error correction of the multifunction contact lens may be conferred by the reshaping function of the lens on the underlying central corneal tissue. In various other embodiments, a central optical zone of a multifunction contact lens may be configured with an anterior surface profile that provides a desired optical power, such as an optical power necessary to correct a residual refractive error not corrected by the optical effect conferred to the central corneal tissue by the posterior surface profile of the multifunction contact lens (i.e., the reshaped central corneal tissue). In various other embodiments, a central optical zone of a multifunction contact lens may be configured with an anterior surface profile that provides higher order aberration correction to correct a residual higher order error or to impart a desired therapeutic aberration structure, such as a predetermined spherical aberration.

In various embodiments, a peripheral optical zone of a multifunction contact lens may be configured with an anterior surface profile that provides a designed mid-peripheral optical zone refractive power, or the peripheral optical zone may be configured to provide wavefront modulation. In various embodiments, the designed mid-peripheral optical zone refractive power may be suitable to cause a peripheral image field to be focused at a target focal plane relative to a mid-peripheral retina in at least one semi-meridian. The anterior surface profile and designed mid-peripheral optical zone refractive power or the wavefront modulation effect may be selected with consideration for other features of the multifunction contact lens, the eye, and the interaction between the two, such as the posterior surface profile of the peripheral optical zone, the tear lens formed or predicted to be formed in the area underlying the peripheral optical zone when the multifunction contact lens is applied to the eye, the mid-peripheral corneal topography, and the geometry of the eye in the region of the mid-peripheral retina. In accordance with various embodiments, an anterior surface profile of a multifunction contact lens may be configured, for example, to provide a plus power refractive effect suitable to cause a peripheral image field to be focused at a target location that is anterior to the mid-peripheral retina. A multifunction contact lens may be designed to provide such a peripheral retina myopic defocus in accordance with various embodiments to regulate progression of a myopic refractive error. Similarly, in various embodiments, an anterior surface profile of a multifunction contact lens may be configured to provide a minus power refractive effect. A multifunction contact lens may be designed to provide such a peripheral retina hyperopic defocus in accordance with various embodiments to regulate a hyperopic refractive error. In various embodiments, a multifunction contact lens may be designed with an anterior surface profile in the peripheral optical zone suitable to provide any desired peripheral optical zone refractive power, or the peripheral optical zone may be configured to provide wavefront modulation, thereby providing any resultant target focal plane relative to the peripheral retina.

In accordance with various embodiments, a method of treating an eye with a multifunction therapeutic optical device is provided. In various embodiments, treating an eye with a multifunction therapeutic optical device comprises treating the eye with a multifunction contact lens suitable to reshape the central cornea of the eye and to provide a lens-eye refractive effect on on-axis and/or off-axis light incident to the peripheral optical zone of the contact lens. In various embodiments, reshaping the central cornea and providing a mid-peripheral lens-eye refractive effect are provided by a single multifunction contact lens.

In various embodiments, the mid-peripheral lens-eye refractive effect (hereinafter interchangeably referred to as "mid-peripheral refractive effect") is produced by the optical properties of a peripheral optical zone of a multifunction contact lens and/or a tear lens underlying the peripheral optical zone of the multifunction contact lens applied to an eye. In various embodiments, the mid-peripheral refractive effect is not produced by corneal reshaping in the vicinity of the mid-peripheral cornea of an eye. In other embodiments, the mid-peripheral corneal geometry of an eye may be altered by application of a multifunction lens, for example, by effects of reshaping in the central corneal region. In various embodiments, the mid-peripheral corneal geometry of the eye may be altered by a reshaping function of the peripheral optical zone of a multifunction contact lens. In various embodiments, corneal reshaping that occurs in the mid-peripheral corneal region may contribute to and be accounted for in the mid-peripheral refractive effect provided by a multifunction contact lens.

In various embodiments, a method of treating an eye with a multifunction contact lens comprises applying the lens for an application period to reshape at least the central corneal tissue of the eye. In accordance with various embodiments, the geometry of the reshaped corneal tissue may persist for at least a portion of the period of time during which the multifunction contact lens is removed. In various embodiments, axial light incident to the central cornea of an eye treated in accordance with various embodiments may be focused at a first focal point relative to the central cornea of the eye during an application period in which the lens is applied to the eye as well and/or during the period of time in which the multifunction contact lens is removed. For example, a multifunction contact lens may reshape the central cornea of an eye to provide central corneal refraction producing focused central vision, with a central optical zone of the lens providing no optical power, such that axial light incident the central cornea is brought into focus on the central retina regardless of whether the lens is in place or removed.

In various embodiments, a mid-peripheral refractive effect is provided discontinuously and only during application of a multifunction contact lens. In accordance with various embodiments any reshaping of the mid-peripheral corneal tissue of an eye produced by a multifunction contact lens is not sufficient to provide a desired mid-peripheral refractive effect and a desired focal point (i.e., a second focal point) relative to the peripheral retina.

In accordance with various embodiments, a method of treating an eye with a multifunction contact lens requires a period of application of the lens during a period of active vision use to provide the desired mid-peripheral refractive effect at a desired focal point relative to the peripheral retina, such as a focal point that promotes emmetropization. In various embodiments, emmetropization may be promoted, for example, by a myopic defocus of on-axis and/or off-axis light relative to the peripheral retina of a myopic eye, or by a hyperopic defocus of on-axis and/or off-axis light relative to the peripheral retina of a hyperopic eye. In accordance with various embodiments, an eye may be treated with a multifunction contact lens having a peripheral optical zone refractive effect suitable to produce a peripheral image field at a target focal plane located in a direction of desired vitreous chamber depth change relative to the mid-peripheral retina. In various embodiments, a sufficient mid-peripheral refractive effect on on-axis and/or off-axis light to promote emmetropization may be achieved with limited periods of wear during active vision use. For example, in various embodiments of methods of treating an eye with a multifunction contact lens, the lens may be worn for a period of up to 4 hours of active vision use, or a period of up to 2 hours, or of up to 1 hour, or of up to 30 minutes of active vision use to promote emmetropization.

It will be apparent to those skilled in the art that various modifications and variations can be made in the present disclosure without departing from the spirit or scope of the disclosure. For example, while the present disclosure is described primarily with reference to contact lenses, the present disclosure can be applied to various other medical and non-medical devices. Likewise, various embodiments and principles of the present disclosure that have been described with respect to regulation of myopia may be adapted by a person of skill in art to regulation of other refractive errors, such as hyperopia or astigmatism. Furthermore, it is known that the effects of defocus on scleral growth are regional within an eye and do not require an intact optic nerve. As a result, the various principles described herein may be applied to specific regions within a contact lens or other therapeutic optical device, thereby providing targeted refractive error correction and/or other refractive effects to predetermined regions of a retina. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

What is claimed is:

1. A multifunction therapeutic optical device comprising:
   a central optical zone having a posterior surface profile configured to impart an altered shape to a central cornea of an eye;
   a peripheral optical zone comprising posterior and anterior surfaces, the posterior surface having a posterior peripheral curve and an anterior peripheral curve selected and combined with both a tissue migration refractive power and a tear lens refractive power to provide the peripheral optical zone with a specific plus power refractive effect suitable to focus on-axis and/or off-axis light incident to the peripheral optical zone at a target focal point located at a position that is anterior to the peripheral retina of the eye; and
   a peripheral landing zone configured to contact a peripheral ocular surface.

2. The device of claim 1, wherein the central optical zone of the device is configured to provide a central optical zone refractive power of about zero.

3. The device of claim 1, wherein the altered shape imparted to the central cornea of the eye is suitable to produce a central refraction with a first focal point relative to a central retina.

4. The device of claim 3, wherein the posterior surface profile of the central optical zone imparts one of an increased radius of curvature, a decreased radius of curvature, or a partially spherical geometry to the central cornea of the eye.

5. The device of claim 1, wherein the altered shape imparted to the central cornea of the eye influences the mid-peripheral corneal geometry of the eye.

6. The device of claim 1, wherein the peripheral optical zone is not configured to reshape the mid-peripheral corneal geometry of the eye.

7. The device of claim 1, wherein one of the central optical zone, the peripheral optical zone, and the landing zone is configured to reshape the mid-peripheral corneal geometry.

8. The device of claim 1, wherein the peripheral optical zone is configured to provide a first peripheral optical zone refractive effect in a first semi-meridian of the eye and a second peripheral optical zone refractive effect in a second semi-meridian of the eye.

9. A method of designing a therapeutic optical device for correction of refractive error and regulation of refractive error development in an eye comprising:
    evaluating a central corneal geometry;
    determining an altered central corneal shape suitable to provide a central corneal refractive correction;
    evaluating a mid-peripheral corneal geometry of the eye, wherein the eye has an altered central corneal shape;
    configuring a posterior surface profile of the therapeutic optical device comprising a central optical zone, a peripheral optical zone, and a peripheral landing zone, wherein the posterior surface profile of the central optical zone is configured to impart the altered central corneal shape to at least the central cornea of the eye, and wherein the posterior surface profile of the peripheral optical zone is configured to provide a tear lens having a tear lens refractive power on the eye;
    configuring an anterior surface geometry of the therapeutic optical device, wherein a central optical zone anterior surface geometry provides a central optical zone refractive power, and wherein a peripheral optical zone anterior surface geometry has a peripheral curve selected to provide a specific peripheral optical zone refractive power;
    wherein the device is configured such that a combination of a mid-peripheral corneal geometry refractive power, a tear lens refractive power, and the peripheral optical zone refractive power cause a peripheral image field to be focused in at least one semi-meridian at a target focal plane relative to a mid-peripheral retina of the eye.

10. The method of claim 9, wherein the target focal plane of the peripheral image field is located in a direction of desired vitreous chamber depth change relative to the mid-peripheral retina of the eye.

11. The method of claim 9, wherein evaluating a mid-peripheral corneal geometry of an eye is performed by measuring a corneal topography of the eye.

12. The method of claim 9, wherein evaluating a mid-peripheral corneal geometry of an eye is performed by predicting the mid-peripheral corneal geometry of the eye based on data from geometries of known fitted lenses and pre- and post-fitting corneal geometry profiles of treated patients.

13. The method of claim 9, wherein the device is configured such that the peripheral image field is focused on the mid-peripheral retina.

14. The method of claim 9, wherein the device is configured such that the target focal plane is one of anterior or posterior to the peripheral retina in at least one semi-meridian.

15. The method of claim 9, wherein the target focal plane is selected to produce emmetropization of the eye.

16. The method of claim 9, wherein the posterior surface profile of one of the central optical zone and the peripheral optical zone is configured to reshape the mid-peripheral corneal geometry of the eye in at least one semi-meridian.

17. The method of claim 9, wherein the posterior surface profile of the therapeutic optical device is configured not to reshape the mid-peripheral corneal geometry of the eye.

* * * * *